US012412533B2

(12) United States Patent
Li et al.

(10) Patent No.: US 12,412,533 B2
(45) **Date of Patent: *Sep. 9, 2025**

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Mingyue Li, Hubei (CN); Chao Tian, Hubei (CN); Yanqing Guan, Hubei (CN); Fei Ai, Hubei (CN); Guanghui Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/248,578

(22) PCT Filed: Mar. 29, 2023

(86) PCT No.: PCT/CN2023/084781

§ 371 (c)(1),
(2) Date: Apr. 11, 2023

(87) PCT Pub. No.: WO2024/159608

PCT Pub. Date: Aug. 8, 2024

(65) Prior Publication Data

US 2025/0087162 A1 Mar. 13, 2025

(30) Foreign Application Priority Data

Jan. 31, 2023 (CN) ........................ 202310099796.X

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0465* (2013.01); *G09G 2310/0267* (2013.01); *G09G 2310/08* (2013.01)

(58) Field of Classification Search
None
See application file for complete search history.

(56) References Cited

U.S. PATENT DOCUMENTS

2007/0274433 A1* 11/2007 Tobita .................. G11C 19/184 377/64
2016/0217757 A1* 7/2016 Tanaka .............. G02F 1/133514
2020/0111859 A1* 4/2020 Ko ........................ H10K 59/121

FOREIGN PATENT DOCUMENTS

CN 103226980 A 7/2013
CN 107221279 A 9/2017
(Continued)

OTHER PUBLICATIONS

International Search Report in International application No. PCT/CN2023/084781,mailed on Jul. 9, 2023.
(Continued)

*Primary Examiner* — Nitin Patel
*Assistant Examiner* — Amen W Bogale
(74) *Attorney, Agent, or Firm* — PV IP PC; Wei Te Chung

(57) ABSTRACT

The present application provides a display panel and a display device, the display panel includes: N scan lines, the N is an integer greater than or equal to 1; and J sets of forward and reverse scan pull-down circuits, each set of the forward and reverse scan pull-down circuits includes N forward and reverse scan pull-down modules, at least a part of each of the forward and reverse scan pull-down modules is disposed in the display subarea, and the J is an integer greater than or equal to 1. In each set of the forward and
(Continued)

reverse scan pull-down circuits, output terminals of the N forward and reverse scan pull-down modules are connected to the N scan lines in a one-to-one correspondence.

14 Claims, 6 Drawing Sheets

(56) References Cited

FOREIGN PATENT DOCUMENTS

| | | | |
|---|---|---|---|
| CN | 107767834 | A | 3/2018 |
| CN | 110400541 | A | 11/2019 |
| CN | 111681625 | A | 9/2020 |
| CN | 115294911 | A | 11/2022 |
| CN | 115410510 | A | 11/2022 |
| CN | 115527477 | A | 12/2022 |
| JP | S6440989 | A | 2/1989 |

OTHER PUBLICATIONS

Written Opinion of the International Search Authority in International application No. PCT/CN2023/084781,mailed on Jul. 9, 2023.

Chinese Office Action issued in corresponding Chinese Patent Application No. 202310099796.X dated Jul. 22, 2025, pp. 1-8.

* cited by examiner

DISPLAY PANEL AND DISPLAY DEVICE

TECHNICAL FIELD

The present application relates to the field of display technologies, and especially relates to a display panel and a display device.

BACKGROUND

With rapid development of display technologies, users' demands for types of display products are diversified. In order to provide users with a better display experience, ultra-high resolution is an important development direction for display panels. However, as resolutions of the display panel increase, there is no doubt that loading of the display panel in display areas is increased accordingly, and an over-loading in the display areas leads to a display abnormality.

Therefore, how to improve the display abnormality caused by over-loading in the display areas is an important bottleneck of the display screens in prior art.

SUMMARY

Technical Issues

An object of the present application is to provide a display panel and a display device, so as to improve a display abnormality in the display panel and in the display device caused by the over-loading in display areas.

Technical Solutions

In a first aspect, the present application provides a display panel, the display panel includes a display area including at least one display subarea, the display panel further includes:

N scan lines, wherein at least a part of each of the N scan lines is disposed in the display subarea, the N scan lines extend along a first direction and are arranged side by side along a second direction, the first direction intersects the second direction, and the N is an integer greater than or equal to 1; and J sets of forward and reverse scan pull-down circuits disposed corresponding to the display subarea, wherein each set of the forward and reverse scan pull-down circuits comprises N forward and reverse scan pull-down modules, at least a part of each of the forward and reverse scan pull-down module is disposed in the display subarea, and the J is an integer greater than or equal to 1;

wherein in each set of the forward and reverse scan pull-down circuits, output terminals of the N forward and reverse scan pull-down modules are electrically connected to the N scan lines in a one-to-one correspondence.

In a second aspect, the present application further provides a display device, the display device includes the display panel mentioned above.

Beneficial Effects

As at least a part of each of the N scan lines is disposed in the display subarea, the J sets of forward and reverse scan pull-down circuits are disposed corresponding to the display subarea, in each of the J sets of forward and reverse scan pull-down circuits, the output terminals of the N forward and reverse scan pull-down modules are electrically connected to the N scan lines in the display subarea in a one-to-one correspondence, and at least a part of each of the forward and reverse scan pull-down module is disposed in the display subarea. No matter when the N scan lines of the display panel are scanned along the second direction or along a direction opposite to the second direction, that falling edges of the scan signals transmitted by the N scanning lines SL in the display subarea are pulled down rapidly can be achieved. Delays of the scan signals transmitted by the N scanning lines SL in the display subarea is improved, thereby improving the display abnormality, reducing a risk of wrong charging, increasing charging times, and facilitating the display panel to achieve a high-frequency display.

DETAILED DESCRIPTION OF THE EMBODIMENT

The technical solutions in the embodiments of the present application will be clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application.

Figure 1:
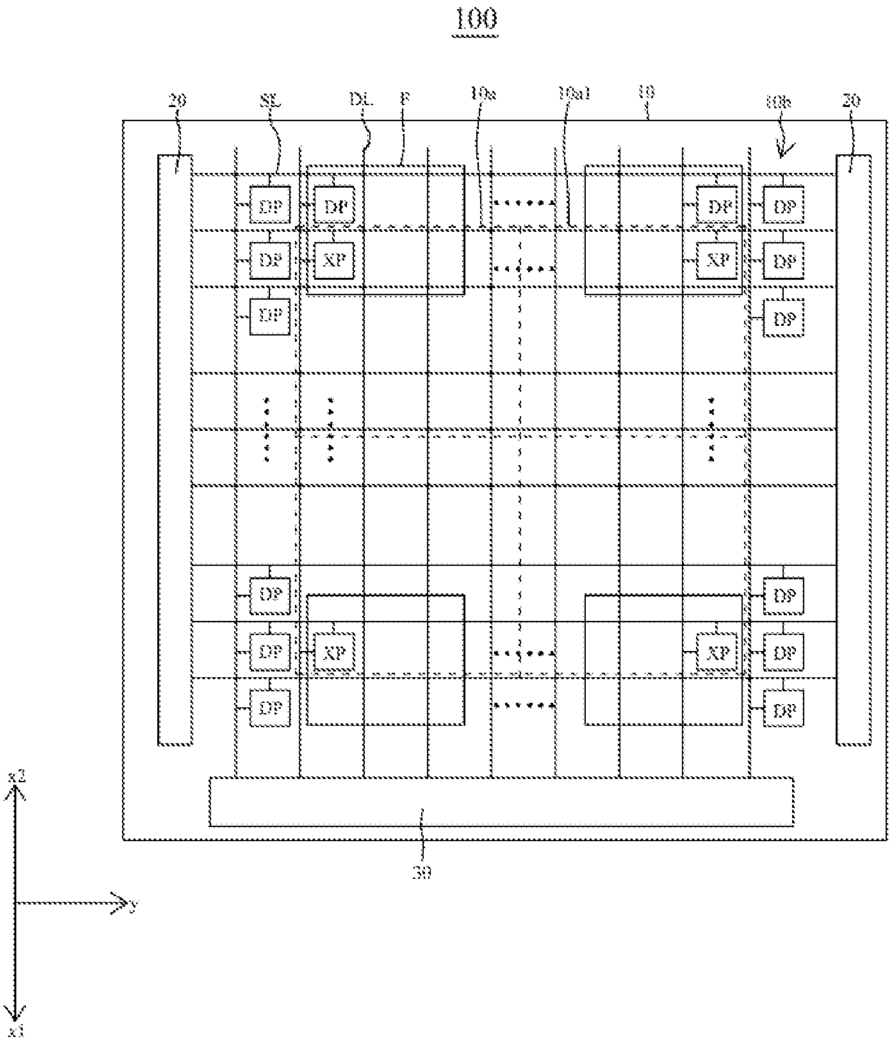
FIG. 1 is a schematic plan diagram of a display device according to an embodiment of the present application.
Figure 2:
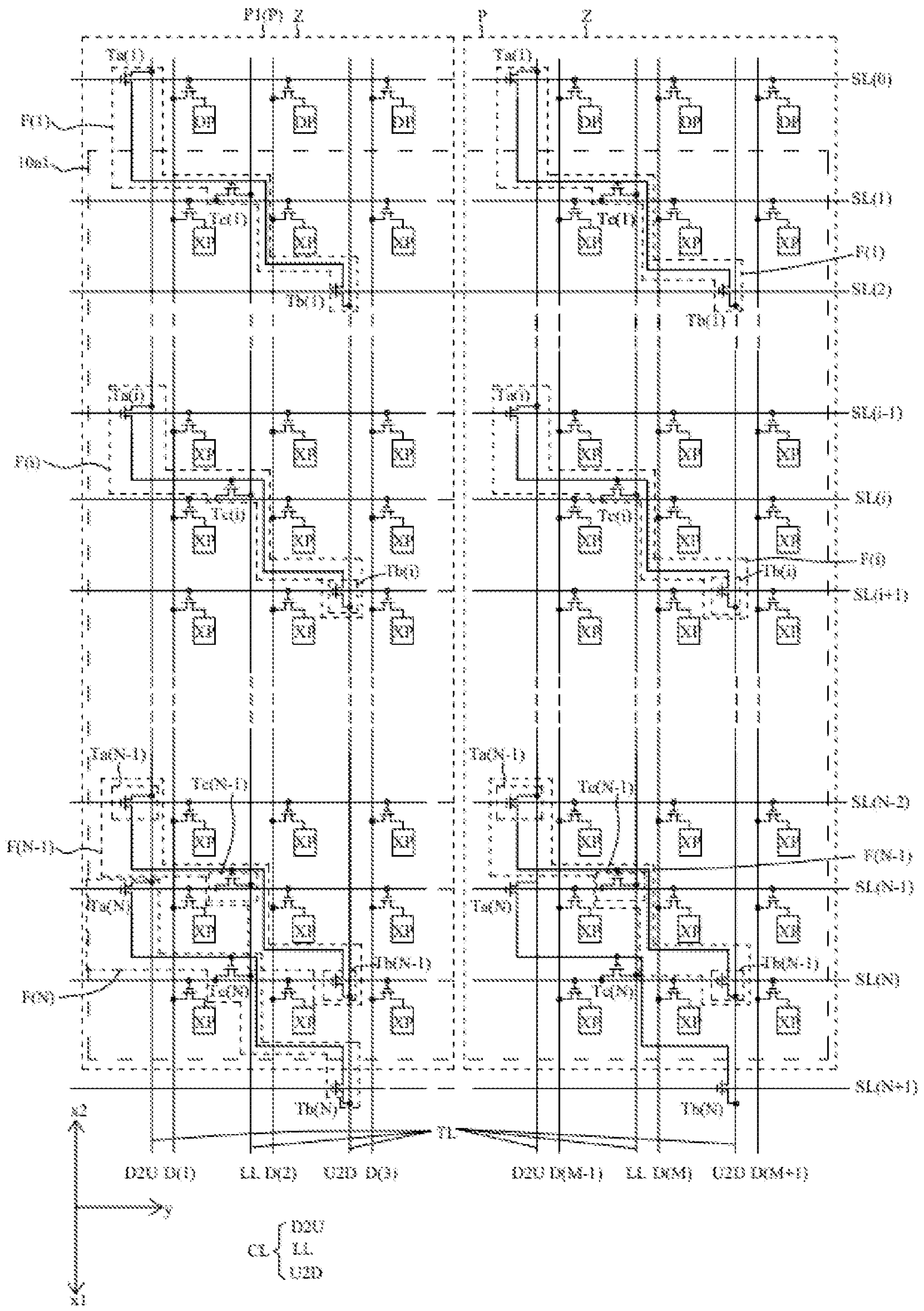
FIG. 2 is a partially enlarged schematic diagram of the display panel shown in FIG. 1.
Figure 3:
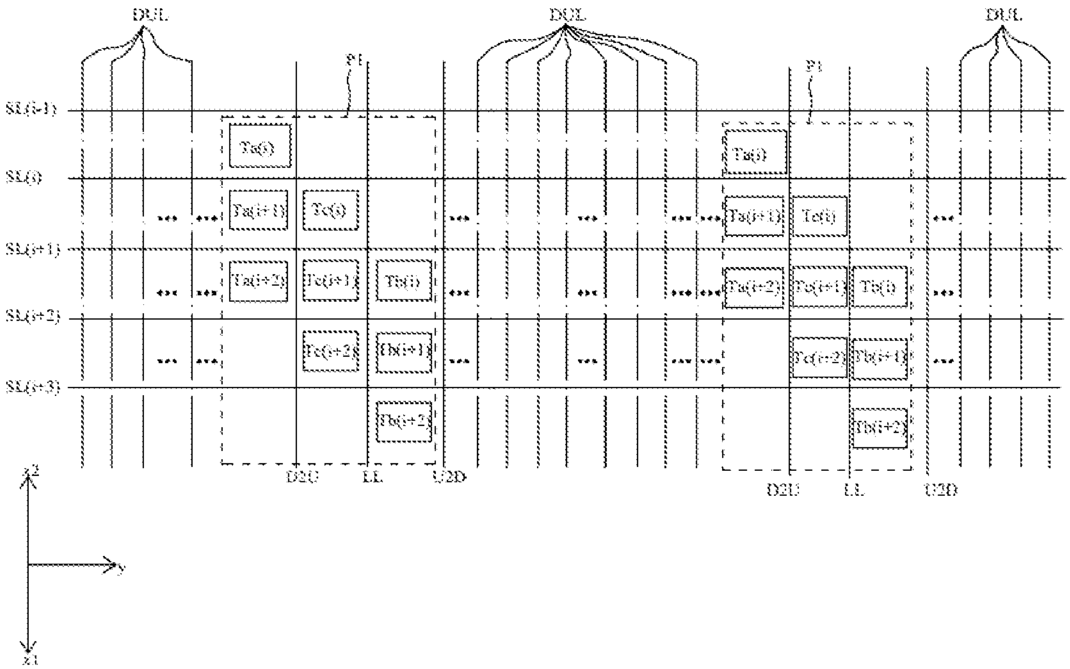
FIG. 3 is a simplified partial schematic diagram of a display subarea shown in FIG. 2.
Figure 4:
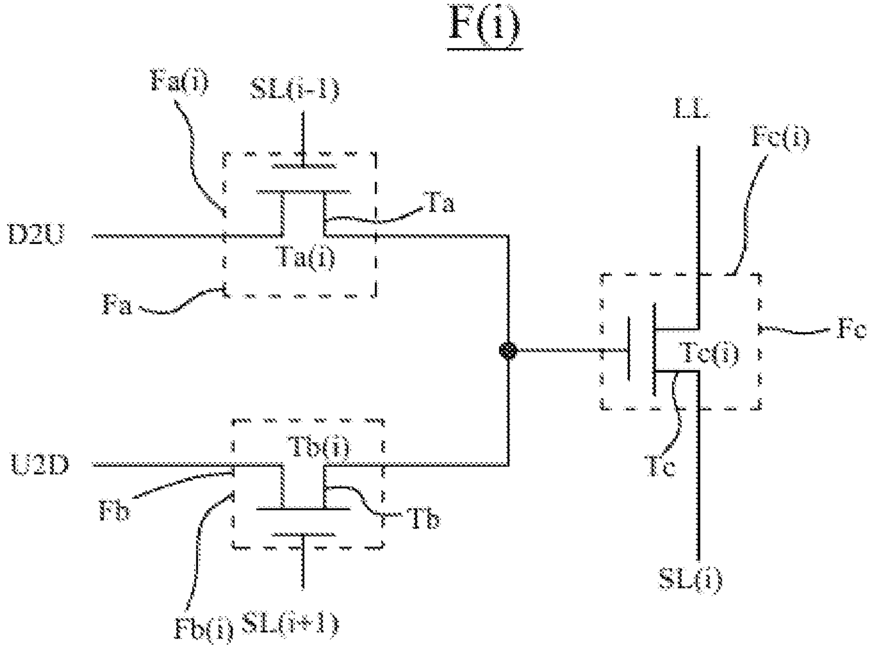
FIG. 4 is a schematic diagram of a circuit of an $i^{th}$ forward and reverse scan pull-down module F(i) of which an output terminal is connected to an $i^{th}$ scan line SL(i) in FIG. 2.
Figure 5:
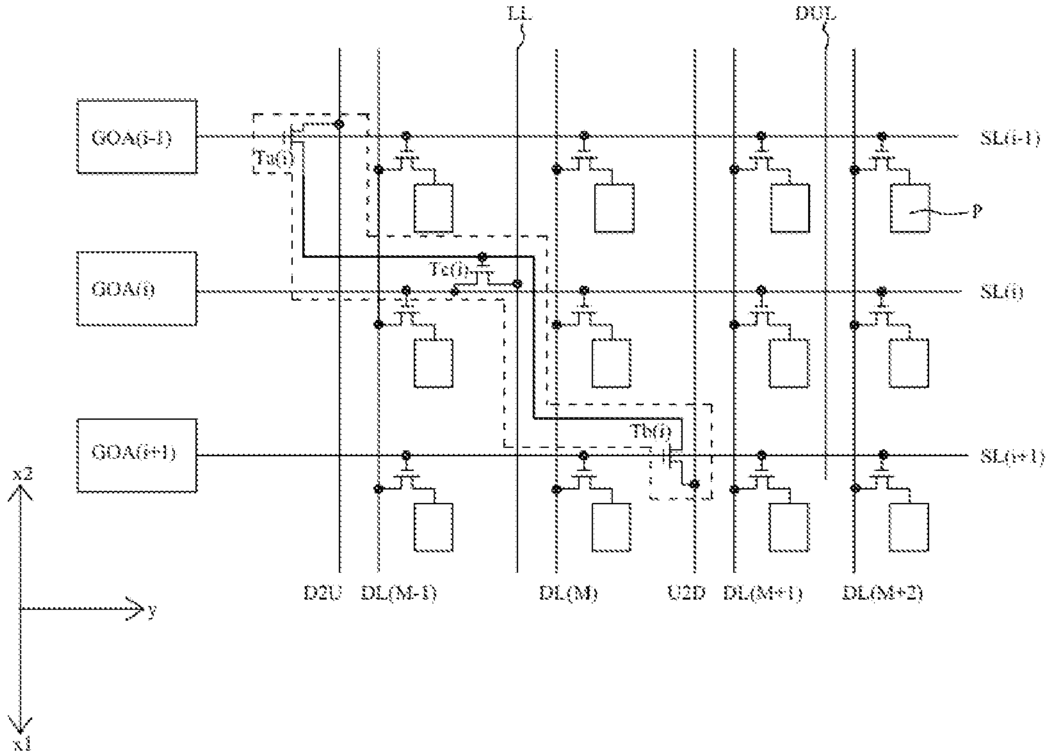
FIG. 5 is a partially enlarged schematic diagram of a display subarea shown in FIG. 2.
Figure 6:
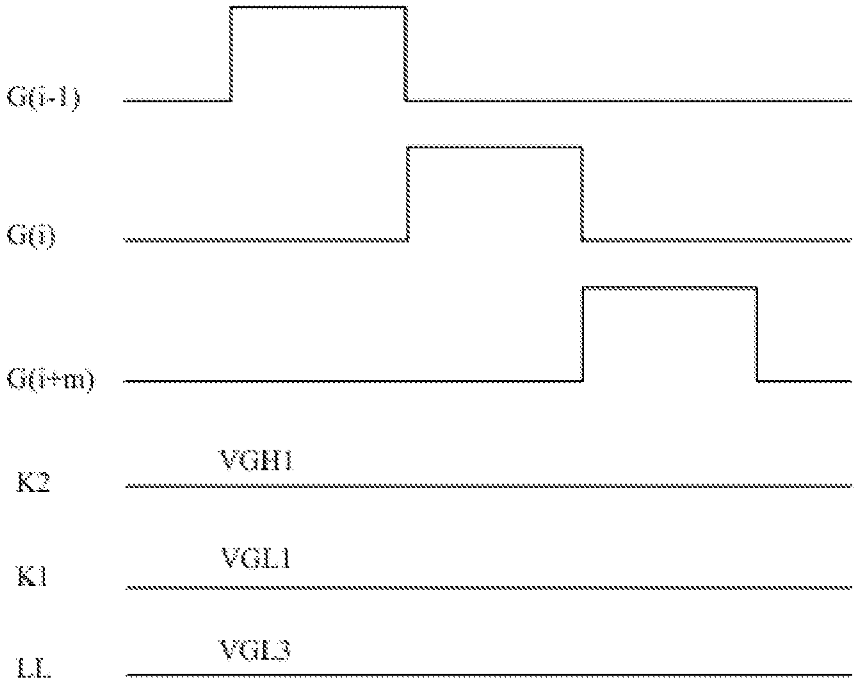
FIG. 6 is a working timing diagram of an $i^{th}$ forward and reverse scan pull-down module F(i) shown in FIG. 5, when a gate driving module outputs scan signals to a plurality of scan lines along a second direction x1.
Figure 7:
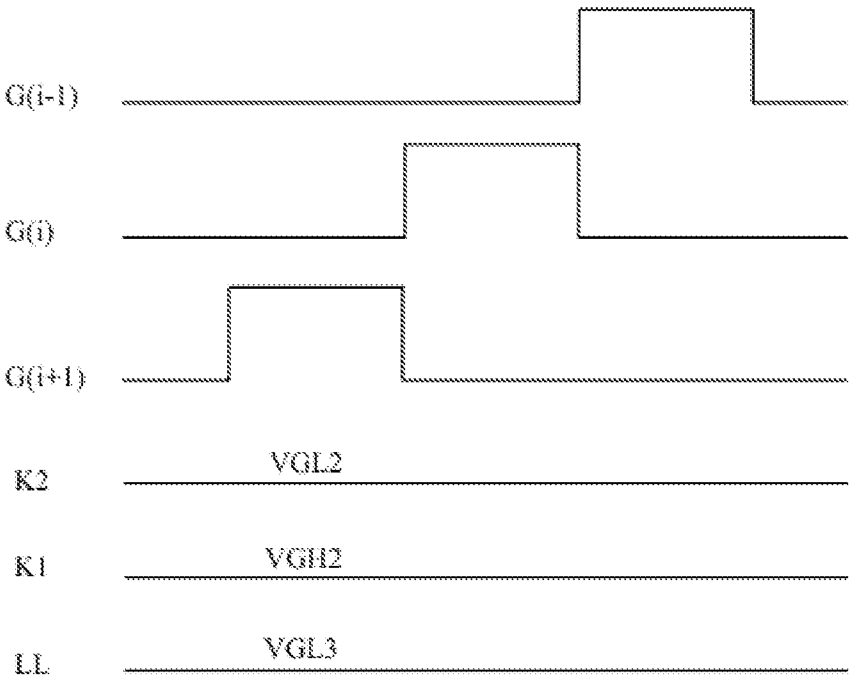
FIG. 7 is a working timing diagram of the $i^{th}$ forward and reverse scan pull-down module F(i) shown in FIG. 5, when the gate driving module outputs scan signals to the plurality of scan lines along a third direction x2.

Please refer to FIG. 1 to FIG. 7. FIG. 1 is a schematic plan diagram of a display device according to an embodiment of the present application. FIG. 2 is a partially enlarged schematic diagram of the display panel shown in FIG. 1. FIG. 3 is a simplified partial schematic diagram of a display subarea shown in FIG. 2. FIG. 4 is a schematic diagram of a circuit of an $i^{th}$ forward and reverse scan pull-down module F(i) of which an output terminal is connected to an $i^{th}$ scan line SL(i) in FIG. 2. FIG. 5 is a partially enlarged schematic diagram of a display subarea shown in FIG. 2. FIG. 6 is a working timing diagram of an $i^{th}$ forward and reverse scan pull-down module F(i) shown in FIG. 5, when a gate driving module outputs scan signals to a plurality of scan lines along a second direction x1. FIG. 7 is a working timing diagram of the $i^{th}$ forward and reverse scan pull-down module F(i) shown in FIG. 5, when the gate driving module outputs scan signals to the plurality of scan lines along a third direction x2.

In this embodiment, a display device 100 is a liquid crystal display device, and the display device 100 includes a display panel 10, a gate driving module 20, a source driving module 30, and a backlight module (not shown), and the display panel 10 is disposed at a light emitting side of the backlight module.

It is understandable that the display device 100 may also be any one of an organic light emitting diode display device, a quantum dot display device, a micro light emitting diode display device and a sub-millimeter light emitting diode display device. When the display device 100 is any one of the organic light emitting diode display device, the quantum dot display device, the micro light emitting diode display device and the sub-millimeter light emitting diode display device, the display device 100 includes the display panel 10, the gate driving module 20 and the source driving module 30, and does not include the backlight module.

In this embodiment, the display panel 10 has a display area 10*a* and a non-display area 10*b* disposed at a periphery of the display area 10*a*.

In this embodiment, the display panel 10 includes a plurality of display pixels XP, a plurality of data lines DL and a plurality of scan lines SL.

In this embodiment, the plurality of display pixels XP are configured to display images. The plurality of display pixels XP are disposed in the display area 10*a* of the display panel 10, and are arranged in an array along a second direction x1 and a first direction y. The second direction x1 intersects the first direction y. Specifically, the second direction x1 is perpendicular to the first direction y, but not limited thereto, and an angle between the second direction x1 and the first direction y may also be an acute angle or an obtuse angle.

It should be noted that display pixels XP in one row formed by the plurality of display pixels XP arranged side by side along the first direction y is a row of the display pixels XP, and display pixels XP in one row formed by the plurality of display pixels XP arranged side by side along the second direction x1 is a column of the display pixels XP.

In this embodiment, as shown in FIG. 5, when the display panel 10 is a liquid crystal display panel, the display pixel XP includes a pixel electrode P. In addition, when the display device 100 is the organic light emitting diode display device, the display pixel XP includes an organic light emitting layer. When the display device 100 is the quantum dot display device, the display pixel XP includes a quantum dot light emitting layer. When the display device 100 is the micro light emitting diode display device or the sub-millimeter light emitting diode display device, the display pixel XP includes an inorganic light emitting diode.

In this embodiment, the display panel 10 further includes a plurality of redundant pixels DP, and the plurality of redundant pixels DP are disposed in the non-display area 10*b* and arranged along a peripheral edge of the display area 10*a*. The plurality of redundant pixels DP are not used for display. The plurality of redundant pixels DP are configured to ensure process yields of the display pixels XP and driving circuits of the display pixels XP, thereby ensuring that the display pixels XP can emit light normally. A common technology to a design of the redundant pixels DP is adopted, and it is not redundantly described here.

Specifically, the plurality of redundant pixels DP includes two rows of the redundant pixels DP and two columns of the redundant pixels DP. The two rows of the redundant pixels DP are respectively disposed at two opposite sides of the display area 10*a* in the second direction x1, and each row of the redundant pixels DP includes the redundant pixels DP arranged side by side along the first direction y. The two columns of the redundant pixels DP are respectively disposed at two opposite sides of the display area 10*a* in the first direction y, and each column of the redundant pixels DP includes the redundant pixels DP arranged side by side along the second direction x1.

It is understandable that the plurality of redundant pixels DP may include more than two rows of the redundant pixels DP and more than two columns of the redundant pixels DP.

In this embodiment, the plurality of data lines DL extend along the second direction x1 and are arranged along the first direction y. Among the plurality of data lines DL, the first one and the last one of the data lines DL arranged along the second first direction y are both disposed in the non-display area 10*b* and respectively disposed at two opposite sides of the display area 10*a* in the first direction y. Each of the first one and the last one of the data lines DL is connected to one column of redundant pixels DP, respectively. Among the plurality of data lines DL, at least a part of each of the data lines DL disposed between the first one and the last one of the data lines DL is disposed in the display area 10*a* and is connected to one column of display pixels XP, respectively.

In this embodiment, as shown in FIG. 2 and FIG. 5, the plurality of data lines DL include a first data line D(1) to a $(M+2)^{th}$ data line D(M+2), at least a part of each data line from the first data line D(1) to the $(M+2)^{th}$ data line D(M+2) is disposed in the display area 10*a*, and M is greater than or equal to 5. The first data line D(1) to the $(M+2)^{th}$ data line D(M+2) include the first data line D(1), a second data line D(2), a third data line D(3), a $(M-1)^{th}$ data line D(M−1), a $M^{th}$ data line D(M), a $(M+1)^{th}$ data line D(M+1) and the $(M+2)^{th}$ data line D(M+2).

In this embodiment, the source driving module 30 is disposed at one side of the display area 10*a* in the second direction x1. The source driving module 30 is connected to the plurality of data lines DL, and the source driver module 30 is configured to transmit data signals to the plurality of data lines DL.

In this embodiment, the plurality of scan lines SL extend along the first direction y and are arranged along the second direction x1. Among the plurality of scan lines SL, the first one and the last one of the scan lines SL arranged along the second direction x1 are both disposed in the non-display area 10*b* and are respectively disposed at two opposite sides of the display area 10*a* in the second direction x1. Each of the first one and the last one of the scan lines SL arranged along the second directions x1 is connected to one row of redundant pixels DP. Among the plurality of scan lines SL, each of the scan lines SL disposed between the first one and the last one of the plurality of scan lines SL is disposed in the display area 10*a* and is connected to one row of display pixels XP.

In this embodiment, as shown in FIG. 2, the plurality of scan lines SL include a $0^{th}$ scan line SL(0) to a $N^{th}$ scan line SL(N) arranged along the second direction x1, the $0^{th}$ scan line SL(0) to the $N^{th}$ scan line SL(N) include the 0th scan line SL(0), a first scan line SL(1), a second scan line SL(2), an $(i-1)^{th}$ scan line SL(i−1), an $i^{th}$ scan line SL(i), an $(i+1)^{th}$ scan line SL(i+1), a $(N-2)^{th}$ scan line SL(N−2), a $(N-1)^{th}$ scan line SL(N−1), a $N^{th}$ scan line SL(N) and a $(N+1)^{th}$ scan line SL(N+1), the i is greater than or equal to 2 and less than or equal to N−1, and the N is greater than or equal to 5. Moreover, the $0^{th}$ scan line SL(0) is disposed in the non-display area 10*b* and is the first one of the scan lines SL arranged along the second direction x1. At least parts of the first scan line SL(1) to the $(N+1)^{th}$ scan line SL(N+1) are disposed in the display area 10*a*.

In this embodiment, the $(i-1)^{th}$ scan line SL(i−1) is configured to transmit an $(i-1)^{th}$ stage scan signal G(i−1), the $i^{th}$ scan line SL(i) is configured to transmit an $i^{th}$ stage scan signal G(i), the $(i+1)^{th}$ scan line SL(i+1) is configured to transmit an $(i+1)^{th}$ stage scan signal G(i+1), other scan signal lines can be deduced in a same way, and it is not redundantly described here.

In this embodiment, at least one gate driving module 20 is disposed at at least one side of the display area 10*a* in the first direction y, the at least one gate driving module 20 is connected to the plurality of scan lines SL, and the at least one gate driving module 20 is configured to output scan signals to the plurality of scan lines SL in a preset order. Specifically, two gate driving modules 20 are respectively disposed at two opposite sides of the display area 10*a* in the first direction y, and two opposite ends of each scan line SL are respectively connected to the two gate driving modules 20, that is, each scan line SL is driven by the two gate driving modules 20.

It is understandable that scan lines SL disposed in odd rows may also be connected to one gate driving module 20, and scan lines SL disposed in even rows may be connected to the other gate driving module 20.

In this embodiment, the display area 10*a* of the display panel 10 includes at least one display subarea 10*a*1. The display subarea 10*a*1 is provided with B×C display pixels XP, the B is the number of columns of display pixels XP, the C is the number of rows of display pixels XP, both the B and the C are integer greater than or equal to 2, and B is less than C.

Specifically, as shown in FIG. 1, the display area 10*a* includes a plurality of display subareas 10*a*1 that are same and arranged in an array along the second direction x1 and the first direction y, that is, the number of rows and columns of display pixels XP in each display subarea 10*a*1 are same, but it is not limited thereto, and the plurality of display subareas 10*a*1 may also be different from each other.

In this embodiment, the display subarea 10*a*1 is taken as an example for illustration, and other display subareas can be deduced in a same way. For example, in the display subarea, the B is equal to 40 and the C is equal to 42, that is, the display subarea 10*a*1 includes 42 rows of display pixels XP and 40 columns of display pixels XP, but it is not limited thereto.

In this embodiment, as shown in FIG. 2, N scan lines SL are disposed in the display subarea 10*a*1, the N scan lines SL extend along the first direction y and are arranged side by side along the second direction x1, and at least a part of each of the N scan lines SL is disposed in the display subarea 10*a*1 and is connected to the plurality of display pixels XP.

It should be noted that if the display area 10*a* includes the plurality of display subareas 10*a*1 along the first direction y, since one scan line SL extends along the first direction y, one part of one scan line SL is disposed in the plurality of display subareas 10*a*1 arranged side by side along the first direction y. In addition, the other part of one scan line SL is disposed in the non-display area 10*b* and is connected to the gate driving module 20.

In this embodiment, the display panel 10 further includes J sets of forward and reverse scan pull-down circuits Z disposed corresponding to each display subareas 10*a*1, the J is an integer greater than or equal to 1, that is, the J sets of forward and reverse scan pull-down circuits Z are disposed corresponding to the display subarea 10*a*1 to pull down falling edges of scan signals transmitted by the N scan lines SL in the display subarea 10*a*1.

In this embodiment, the J is greater than or equal to 1 and less than or equal to 4. It should be noted that the larger the J is, the faster pull-down speeds of the J sets of forward and reverse scan pull-down circuits Z on the falling edges of the scan signals transmitted by the N scanning lines SL, but also causes too many circuits in the display area 10*a* that reduces an aperture ratio of the display area 10*a*.

In order to describe technical solutions of the present application, as shown in FIG. 2, the J equal to 2 is taken as an example for illustration, that is, two sets of forward and reverse scan pull-down circuits Z are configured to pull down the falling edges of the scan signals transmitted by the N scan lines SL in the display subarea 10*a*1, but not limited thereto, and the J may also be equal to 1, 3 or greater than 3.

In this embodiment, each set of forward and reverse scan pull-down circuits Z includes N forward and reverse scan pull-down modules F, and at least a part of each forward and reverse scan pull-down module F is disposed in one display subarea 10*a*1. In each set of forward and reverse scan pull-down circuits Z, output terminals of the N forward and reverse scan pull-down modules F are electrically connected to the N scan lines SL in a one-to-one correspondence, so that either along the second direction x1, or along a third direction x2 opposite to the second direction x1, when the gate driving modules 20 sequentially output scan signals to the scanning lines SL, the N forward and reverse scan pull-down modules F pull down the N scan lines SL in the display subarea 10*a*1 in a one-to-one correspondence. A problem of delays of scan signals transmitted by the N scan lines SL in the display subarea 10*a*1 is thus improved, thereby improving an display abnormality caused by delays of the scan signals, reducing a risk of wrong charging, increasing charging times, and facilitating the display device to achieve a high-frequency display.

It should be noted that the at least one gate driving module 20 of the display device 100 has a function of scanning the scanning lines SL along the second direction x1 and along the third direction x2. Meanwhile, either along the second direction x1 or along the third direction x2, the J sets of forward and reverse scan pull-down circuits Z can quickly pull down the falling edges of the scan signals transmitted by the N scan lines SL in the display subarea 10*a*1, which can be suitable to a situation that an installation direction of the display device 100 is uncertain.

In this embodiment, as shown in FIG. 2, the J sets of forward and reverse scan pull-down circuits Z are arranged along the first direction y. That is, the J sets of forward and reverse scan pull-down circuits Z are arranged along an extending direction of each scan line SL, so that the falling edge of the scan signal transmitted by each scan line SL is pulled down faster.

In this embodiment, each set of forward and reverse scan pull-down circuits Z includes K rows of forward and reverse scan pull-down modules P. Each row of forward and reverse scan pull-down modules P includes N/K forward and reverse scan pull-down modules F arranged along the second direction x1, and K is greater than or equal to 1 and less than or equal to N.

Specifically, the N/K forward and reverse scan pull-down modules F of each row of forward and reverse scan pull-down modules P are arranged side by side along the second direction x1. It is understandable that the N/K forward and reverse scan pull-down modules F of each row of forward and reverse scan pull-down modules P can also be arranged staggered along the second direction x1.

In this embodiment, as shown in FIG. 4, each forward and reverse scan pull-down module F includes a forward scan control unit Fb, a reverse scan control unit Fa, and a pull-down unit Fc. A control terminal of the pull-down unit Fc is connected to an output terminal of the forward scan control unit Fb and an output terminal of the reverse scan control unit Fa, and an output terminal of the pull-down unit Fc is connected to one of the scan lines SL. Thus, the pull-down unit Fc of each forward and reverse scan pull-down module F is controlled by a signal output by one of the forward scan control unit Fb and the reverse scan control unit Fa, thereby pulling down the falling edge of the scan signal transmitted by one of the scan lines SL.

In this embodiment, the display panel 10 further includes J groups of signal lines TL disposed corresponding to the display subarea 10*a*1, and the J groups of signal lines TL and the J sets of forward and reverse scan pull-down circuits Z are disposed in a one-to-one correspondence, that is, each group of signal lines TL is disposed corresponding to one set of forward and reverse scan pull-down circuits Z. Each group of signal lines TL includes K groups of common signal lines CL, the K groups of common signal lines CL are connected to the K rows of forward and reverse scan pull-down modules P in a one-to-one correspondence. The N/K forward and reverse scan pull-down modules F of each row of forward and reverse scan pull-down modules P are connected to one group of common signal lines CL, so that the N/K forward and reverse scan pull-down modules F of each row of forward and reverse scan pull-down modules P share one group of common signal lines CL. Wirings in the display area 10*a* are thus reduced, thereby increasing the aperture ratio of the display panel 10.

It should be noted that the J groups of signal lines TL disposed corresponding to the display subarea 10*a*1 means that at least parts of the J groups of signal lines TL are disposed in the display subarea 10*a*1. The arrangement of J groups of signal lines TL and the J sets of forward and reverse scan pull-down circuits Z being disposed in a one-to-one correspondence means that each group of signal lines TL and a corresponding one set of forward and reverse scan pull-down circuits Z are disposed in a same display subarea 10*a*1.

In this embodiment, each group of common signal lines CL includes a forward scan control signal line U2D, a reverse scan control signal line D2U and a low level signal line LL arranged adjacent to each other, and the forward scan control signal line U2D, the reverse scan control signal line D2U and the low level signal line LL extend along the second direction x1 and are arranged along the first direction y. Moreover, in each group of common signal lines CL, the low level signal line LL is disposed between the forward scan control signal line U2D and the reverse scan control signal line D2U.

In this embodiment, the reverse scan control signal line D2U is configured to transmit a reverse scan control signal K1, the forward scan control signal line U2D is configured to transmit a forward scan control signal K2, and phases of the reverse scan control signal K1 and the forward scan control signal K2 are reversed. The reverse scan control signal K1 and the forward scan control signal K2 are related to a direction of scanning of the plurality of scan lines SL, so as to make a rapid pull-down, according to the direction of scanning, of the falling edges of the scan signals transmitted by the plurality of scan lines more stable and controllable.

Moreover, the reverse scan control signal K1 and the forward scan control signal K2 can be direct current signals simultaneously, but not limited thereto. The reverse scan control signal K1 and the forward scan control signal K2 may also be alternative current signals simultaneously.

In this embodiment, the low level signal line LL is configured to transmit a low level signal, and the low level signal may be a constant-voltage low-potential signal, or a pulse signal including a low-potential state.

In this embodiment, second input terminals of the forward scan control units Fb of the N/K forward and reverse scan pull-down modules F of each row of forward and reverse scan pull-down modules P are connected to a same forward scan control signal line U2D. Second input terminals of the reverse scan control units Fa of the N/K forward and reverse scan pull-down modules F of each row of forward and reverse scan pull-down modules P are connected to a same reverse scan control signal line D2U. Input terminals of the pull-down units Fc of the N/K forward and reverse scan pull-down modules F of each row of forward and reverse scan pull-down module P are connected to a same low level signal line LL.

Specifically, as shown in FIG. 2, the K is set to 1, that is, each set of forward and reverse scan pull-down circuits Z includes a first row of forward and reverse scan pull-down module P1, and the first row of forward and reverse scan pull-down module P1 includes N forward and reverse scan pull-down modules F arranged along the second direction x1. The N forward and reverse scan pull-down modules F include the first forward and reverse scan pull-down module F(1) to a $N^{th}$ forward and reverse scan pull-down module F(N). The N forward and reverse scan pull-down modules F of the first row of forward and reverse scan pull-down of the module P1 are respectively electrically connected to the N scan lines SL in the display subarea 10*a*1 in a one-to-one correspondence. The N forward and reverse scan pull-down modules F of the first row of forward and reverse scan pull-down modules P1 are arranged side by side along the second direction x1. In addition, when the K is set to 1, one group of signal lines TL includes one group of common signal lines CL, the first forward and reverse scan pull-down module F(1) to the $N^{th}$ forward and reverse scan pull-down module F(N) of the first row of forward and reverse scan pull-down module P1 are all connected to one set of common signal lines CL.

In this embodiment, referring to FIG. 2 with FIG. 4, in each row of forward and reverse scan pull-down modules P, the forward and reverse scan pull-down module F of which an output terminal is connected to the $i^{th}$ scan line SL(i) is an $i^{th}$ forward and reverse scan pull-down module F(i). An output terminal of an pull-down unit Fc(i) of the $i^{th}$ forward and reverse scan pull-down module F(i) is connected to the $i^{th}$ scan line SL(i), and an input terminal of the pull-down unit Fc(i) of the $i^{th}$ forward and reverse scan pull-down module F(i) is connected to the low level signal line LL, so that the pull-down unit Fc(i) of the $i^{th}$ forward and reverse scan pull-down module F(i) is responsive to an signal output by an forward scan control unit Fb(i) or an reverse scan control unit Fa(i), and output the low level signal transmitted by the low level signal line LL to the $i^{th}$ scan line SL(i), so as to pull down a falling edge of an scan signal transmitted by the $i^{th}$ scan line SL(i).

A first input terminal of the forward scan control unit Fb(i) of the $i^{th}$ forward and reverse scan pull-down module F(i) is connected to the (i+1)$^{th}$ scan line S(i+1), and a second input terminal of the forward scan control unit Fb(i) of the i$^{th}$ forward and reverse scan pull-down the module F(i) is connected to the forward scan control signal line U2D, so that the forward scan control unit Fb(i) of the i$^{th}$ forward and reverse scan pull-down module F(i) output the forward scan control signal K2 to a control terminal of the pull-down unit Fc(i) of the i$^{th}$ forward and reverse scan pull-down module F(i) according to the scan signal transmitted by the (i+1)$^{th}$ scan line S(i+1) and the control signal transmitted by the forward scan control signal line U2D.

A first input terminal of the reverse scan control unit Fa(i) of the i$^{th}$ forward and reverse scan pull-down module F(i) is connected to the (i−1)$^{th}$ scan line SL(i−1), and a second input terminal of the reverse scan control unit Fa(i) of the i$^{th}$ forward and reverse scan pull-down of the module F(i) is connected to the reverse scan control signal line D2U, so that the reverse scan control unit Fa(i) of the i$^{th}$ forward and reverse scan pull-down of the module F(i) output the reverse scan control signal K1 to the control terminal of the pull-down unit Fc(i) of the i$^{th}$ forward and reverse scan pull-down module F(i) according to the scan signal transmitted by the (i−1)$^{th}$ scan line SL(i−1) and the control signal transmitted by the reverse scan control signal line D2U.

Specifically, as shown in FIG. 4, for the i$^{th}$ forward and reverse scan pull-down module F(i) of which the output terminal is connected to the i$^{th}$ scan line SL(i), the i$^{th}$ forward and reverse scan pull-down module F(i) includes the forward scan control unit Fb(i), the reverse scan control unit Fa(i) and the pull-down unit Fc(i). The forward scan control unit Fb(i) includes an i$^{th}$ forward scan control transistor Tb(i), the reverse scan control unit Fa(i) includes an i$^{th}$ reverse scan control transistor Ta(i), and the pull-down unit Fc(i) includes an i$^{th}$ pull-down transistor Tc(i).

Moreover, one of a source and a drain of the i$^{th}$ forward scan control transistor Tb(i) is connected to a gate of the i$^{th}$ pull-down transistor Tc(i). The other one of the source and the drain of the i$^{th}$ forward scan control transistor Tb(i) is connected to the forward scan control signal line U2D. A gate of the i$^{th}$ forward scan control transistor Tb(i) is connected to the (i+1)$^{th}$ scan line S(i+1).

One of a source and a drain of the i$^{th}$ reverse scan control transistor Ta(i) is also connected to the gate of the i$^{th}$ pull-down transistor Tc(i). The other one of the source and the drain of the i$^{th}$ reverse scan control transistor Ta(i) is connected to the reverse scan control signal line D2U. A gate of the i$^{th}$ reverse scan control transistor Ta(i) is connected to the (i−1)$^{th}$ scan line SL(i−1).

One of a source and a drain of the i$^{th}$ pull-down transistor Tc(i) is connected to the i$^{th}$ scan line SL(i). The other one of the source and the drain of the i$^{th}$ pull-down transistor Tc(i) is connected to the low level signal line LL.

It should be noted that the i$^{th}$ forward scan control transistor Tb(i), the i$^{th}$ reverse scan control transistor Ta(i), and the i$^{th}$ pull-down transistor Tc(i) are independently selected from anyone of a n-type thin film transistor and a p-type thin film transistor. The i$^{th}$ forward scan control transistor Tb(i), the i$^{th}$ reverse scan control transistor Ta(i), and the i$^{th}$ pull-down transistor Tc(i) are independently selected from anyone of a metal oxide thin film transistor, a low-temperature polysilicon thin film transistor, and an amorphous silicon thin film transistor.

Specifically, in this embodiment, the i$^{th}$ forward scan control transistor Tb(i), the i$^{th}$ reverse scan control transistor Ta(i) and the i$^{th}$ pull-down transistor Tc(i) are all n-type low temperature polysilicon thin film transistors.

In this embodiment, in each row of forward and reverse scan pull-down modules P, the forward scan control units Fb of the N/K forward and reverse scan pull-down modules F are arranged side by side along the second direction x1, that is, the forward scan control units Fb of the N/K forward and reverse scan pull-down modules F are the forward scan control units Fb in one row. The reverse scan control units Fa of the N/K forward and reverse scan pull-down modules F are arranged side by side along the second direction x1, that is, the reverse scan control units Fa of the N/K forward and reverse scan pull-down modules F are the reverse scan control units Fa in one row. The pull-down units Fc of the N/K forward and reverse scan pull-down modules F are arranged side by side along the second direction x1, that is, the pull-down units Fc of the N/K forward and reverse scan pull-down modules F are the pull-down unit Fc in one row. In each row of forward and reverse scan pull-down modules P, in the first direction y, the pull-down units Fc in one row are disposed between the forward scan control units Fb in one row and the reverse scan control units Fa in one row.

Specifically, as shown in FIG. 3, when K is set to 1, in each row of forward and reverse scan pull-down modules P, the i$^{th}$ forward scan control transistor Tb(i), an (i+1)$^{th}$ forward scan control transistor Tb(i+1) and an (i+2)$^{th}$ forward scan control transistor Tb(i+2) are arranged side by side along the second direction x1. The i$^{th}$ reverse scan control transistor Ta(i), an (i+1)$^{th}$ reverse scan control transistor Ta(i+1) and an (i+2)$^{th}$ reverse scan control transistor Ta(i+2) are arranged side by side along the second direction x1. The i$^{th}$ pull-down transistor Tc(i), an (i+1)$^{th}$ pull-down transistor Tc(i+1) and an (i+2)$^{th}$ pull-down transistor Tc(i+2) are arranged side by side along the second direction x1.

Please refer to FIG. 5 with FIG. 6, when the gate driving modules 20 sequentially output the scan signals to the plurality of scan lines SL along the second direction x1, after an (i−1)$^{th}$ stage gate driving unit GOA(i−1) of the gate driving modules 20 outputs an (i−1)$^{th}$ stage scan signal G(i−1) with high-level to the (i−1)$^{th}$ scan line SL(i−1), an i$^{th}$ stage gate driving unit GOA(i) of the gate driving modules 20 outputs an (i)$^{th}$ stage scan signal G(i) with high-level to the i$^{th}$ scan line SL(i). Then, an (i+1)$^{th}$ stage gate driving unit GOA(i+1) of the gate driving modules 20 outputs an (i+1)$^{th}$ stage scan signal G(i+1) with high-level to the (i+1)$^{th}$ scan line SL(i+1). In that situation, the forward scan control signal K2 is a first direct current high potential signal VGH1, the reverse scan control signal K1 is a first direct current low potential signal VGL1, and the low level signal line LL transmits a constant-voltage low-level signal VGL3.

When the (i+1)$^{th}$ scan line SL (i+1) receives the (i+1)$^{th}$ stage scan signal G (i+1) with high-level, the i$^{th}$ reverse scan control transistor Ta (i) is turned off, the i$^{th}$ forward scan control transistor Tb (i) is turned on, the i$^{th}$ pull-down transistor Tc (i) is turned on according to the first direct current high potential signal VGH1 outputted by the i$^{th}$ forward scan control transistor Tb (i) which is turned-on. The low level signal line LL thus transmits a constant-voltage low-level signal VGL3 to the i$^{th}$ scan line SL(i), so as to achieve a rapid pudd-down of the falling edge of the (i)$^{th}$ stage scan signal G(i) in a high-level.

Please refer to FIG. 5 and FIG. 7, when the gate driving modules 20 sequentially outputs the scan signals to the plurality of scan lines SL along the third direction x2 opposite to the second direction x1, after the (i+1)$^{th}$ stage gate driving unit GOA(i+1) of the gate driving modules 20 outputs the (i+1)$^{th}$ stage scan signal G(i+1) with high-level to the (i+1)$^{th}$ scan line SL(i+1), the i$^{th}$ stage gate driving unit GOA(i) of the gate driving modules 20 outputs the (i)$^{th}$ stage scan signal G(i) with high-level to the $i^{th}$ scan line SL(i). Continuously, the $(i-1)^{th}$ stage gate driving unit GOA(i−1) of the gate driving modules 20 outputs the $(i-1)^{th}$ stage scan signal G(i−1) with high-level to the $(i-1)^{th}$ scan line SL(i−1). At this timing, the forward scan control signal K2 is a second direct current low potential signal VGL2, the reverse scan control signal K1 is a second direct current high potential signal VGH2, and the low level signal line LL transmits the constant-voltage low-level signal VGL3.

When the $(i-1)^{th}$ scan line SL(i−1) outputs the $(i-1)^{th}$ stage scan signal G(i−1) with high-level, the $(i+1)^{th}$ scan line SL(i+1) outputs the $(i+1)^{th}$ stage scan signal G(i+1) with low-level, the $i^{th}$ reverse scan control transistor Ta(i) is turned on according to the $(i-1)^{th}$ stage scan signal G(i−1) with high-level, the $i^{th}$ forward scan control transistor Tb(i) is turned off according to the $(i+1)^{th}$ stage scan signal G(i+1) with low-level, and the $i^{th}$ pull-down transistor Tc(i) is turned on according to the second direct current high potential signal VGH2 outputted by the $i^{th}$ reverse scan control transistor Ta(i) which is turned on. By means of this situation, the constant-voltage low-level signal VGL3 transmitted by the low level signal line LL is outputted to the $i^{th}$ scan line SL(i), so as to achieve a rapid pull-down of the falling edge of the $(i)^{th}$ stage scan signal G(i) in a high-level.

In this embodiment, as shown in FIG. 3, the display panel 10 further includes at least one redundant signal line DUL, at least a part of the at least one redundant signal line DUL is disposed in the display area 10*a*, and the at least one redundant signal line DUL is in a floating state, so that the redundant signal line DUL does not transmit signals. It should be noted that, when a distribution of wirings of the display panel 10 in the display area is non-uniform, the distribution of wirings of the display panel 10 will be uniform by adding at least one redundant signal line DUL in the floating state, so that a, so as to improve a non-uniform of display brightness of the display device 100.

In this embodiment, as shown in FIG. 3, a plurality of redundant signal lines DUL extend along the second direction x1. The plurality of redundant signal lines DUL are regularly arranged in the display subarea 10*a*1. The distribution of the aperture ratio of the display device 100 is thus made uniform.

Specifically, in the display subarea 10*al*, there are a plurality of redundant signal lines DUL disposed at intervals and disposed between one of the row of forward and reverse scan pull-down modules P1 and another one of the first row of forward and reverse scan pull-down modules P1. There are also a plurality of redundant signal lines DUL disposed at intervals and disposed at a side of one of the first row of forward and reverse scan pull-down modules P1 away from another one of the first row of forward and reverse scan pull-down modules P1. There are also a plurality of redundant signal lines DUL disposed at intervals and disposed at a side of another one of the first row of forward and reverse scan pull-down modules P1 away from one of the first row of forward and reverse scan pull-down modules P1. The redundant signal lines DUL in each of the plurality of display subareas 10*a*1 are regularly arranged as shown in FIG. 3, so as to ensure the distribution uniformity of the aperture ratio of the display area 10*a* of the display device 100.

In this embodiment, the plurality of redundant signal lines DUL and the data lines DL are arranged adjacent to each other in a one-to-one correspondence. The plurality of redundant signal lines DUL and the data lines DL are disposed on a same layer. It is understandable that the plurality of redundant signal lines DUL and the data lines DL may be disposed on different layers.

It should be noted that black dots in FIG. 3 represent signal lines for transmitting signals, and the signal lines may be data lines DL etc.

In this embodiment, at least one of the reverse scan control signal line D2U, the low level signal line LL, and the forward scan control signal line U2D is disposed on a same layer with the redundant signal line DUL and arranged at intervals therewith. Such an arrangement is beneficial to utilize the existing redundant signal lines DUL to serves as the reverse scan control signal line D2U, the low level signal line LL, and the forward scan control signal line U2D, so as to reduce metal wirings that are need to be added, thereby improving a problem of reducing the aperture ratio of the display device 100.

Specifically, at least one of the reverse scan control signal line D2U, the low level signal line LL, and the forward scan control signal line U2D are same as the redundant signal lines DUL in shape, material and extension direction. That is, the existing redundant signal lines DUL is used to serve as at least one of the reverse scan control signal line D2U, the low level signal line LL, and the forward scan control signal line U2D.

It should be noted that, when the display panel 10 includes the redundant signal lines DUL, all or a part of the redundant signal lines DUL in the display panel 10 can be used as the reverse scan control signal line D2U, the low level signal line LL, and the forward scan control signal line U2D. In addition, when the display panel 10 does not include the redundant signal lines DUL, the reverse scan control signal line D2U, the low level signal line LL, and the forward scan control signal line U2D can also be formed by adding wirings on the display panel 10.

In this embodiment, the reverse scan control signal line D2U, the low level signal line LL, and the forward scan control signal line U2D are adjacent to and spaced apart from three adjacent data lines DL in a one-to-one correspondence, so that the reverse scan control signal line D2U, the low level signal line LL, and the forward scan control signal line U2D are evenly distributed in the display area 10*a*, thereby improving the uniformity of the aperture ratio of the display area 10*a* of the display device 100.

In another embodiment, at least one of the reverse scan control signal line D2U, the low level signal line LL, and the forward scan control signal line U2D is disposed on a different layer and overlaps with the data lines DL, so as to improve the aperture ratio of the display panel 10. For example, at least one of the reverse scan control signal line D2U, the low level signal line LL, and the forward scan control signal line U2D may be disposed on a light-shielding metal layer different from the data lines DL and overlaps the data lines DL.

Figure 8:
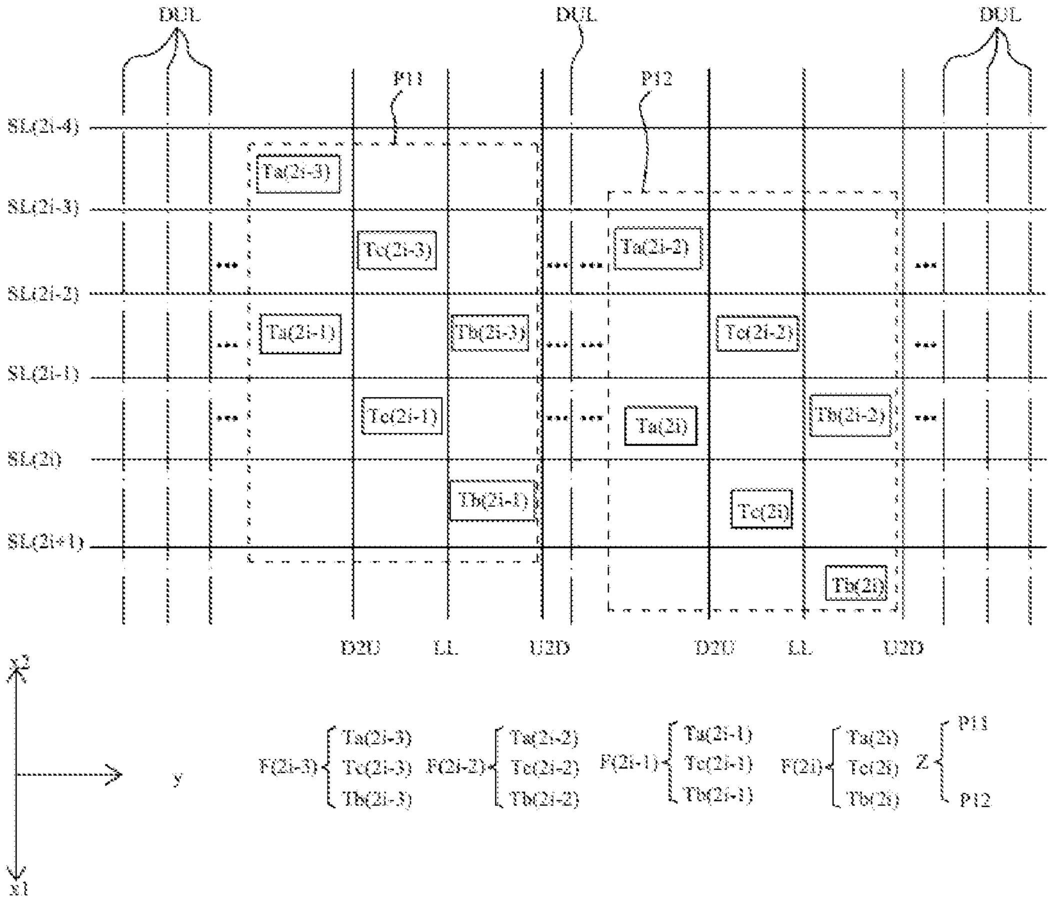
FIG. 8 is a partially enlarged schematic diagram of a display subarea of a display device according to another embodiment of the present application.

Please refer to FIG. 8, which is a partially enlarged schematic diagram of a display subarea of a display device according to another embodiment of the present application. The display device of this embodiment is basically similar to the display device shown in FIG. 1. Similar portion is not repeated, and differences include the following: the plurality of scan lines SL include a $(2i-4)^{th}$ scan line SL(2i−4), a $(2i-3)^{th}$ scan line SL(2i−3), a $(2i-2)^{th}$ scan line SL(2i−2), a $(2i-1)^{th}$ scan line SL(2i−1), a $2i^{th}$ scan line SL(2i) and a $(2i+1)^{th}$ scan line SL(2i+1); the K is set to 2; each set of forward and reverse scan pull-down circuits Z includes a first row of forward and reverse scan pull-down modules P11 and a second row of forward and reverse scan pull-down modules P12 arranged along the first direction; the first row of forward and reverse scan pull-down module P11 include an $(2i-1)^{th}$ forward and reverse scan pull-down module F(2i−1) of which an output terminal is connected to the $(2i-1)^{th}$ scan line SL(2i−1); the second row of forward and reverse scan pull-down module P12 includes an $(2i)^{th}$ forward and reverse scan pull-down module F(2i) of which an output terminal is connected to a $2i^{th}$ scan line; and the i is greater than or equal to 1 and less than or equal to N/2. By means of this arrangement, the N forward and reverse scan pull-down modules F of each set of forward and reverse scan pull-down circuits Z are arranged in two rows to realize that the falling edges of the scan signals transmitted by the N scan lines are rapidly pulled down and that a problem of uneven display caused by line concentration is improved.

Specifically, in each set of forward and reverse scan pull-down circuits Z, the first row of forward and reverse scan pull-down modules P11 and the second row of forward and reverse scan pull-down modules P12 are arranged at intervals along the first direction y. There is one redundant signal line DUL disposed between the first row of forward and reverse scan pull-down modules P11 and the second row of forward and reverse scan pull-down modules P12. There are also a plurality of redundant signal lines DUL disposed at intervals and disposed at a side of the first row of forward and reverse scan pull-down modules P11 away from the second row of forward and reverse scan pull-down modules P12. There are also a plurality of redundant signal lines DUL disposed at intervals and disposed at a side of the second row of forward and reverse scan pull-down modules P12 away from the first row of forward and reverse scan pull-down modules P11. For the plurality of sets of forward and reverse scan pull-down circuits Z, an arrangement of the redundant signal lines DUL is shown in FIG. 8.

Moreover, the first row of forward and reverse scan pull-down module P11 includes a $(2i-1)^{th}$ forward and reverse scan pull-down module F(2i−1) and a $(2i-3)^{th}$ forward and reverse scan pull-down module F(2i−3). The $(2i-1)^{th}$ forward and reverse scan pull-down module F(2i−1) includes a $(2i-1)^{th}$ forward scan control transistor Tb (2i−1), a $(2i-1)^{th}$ reverse scan control transistor Ta(2i−1) and a $(2i-1)^{th}$ pull-down transistor Tc(2i−1). The $(2i-3)^{th}$ forward and reverse scan pull-down module F(2i−3) includes a $(2i-3)^{th}$ forward scan control transistor Tb(2i−3), a $(2i-3)^{th}$ reverse scan control transistor Ta(2i−3) and a $(2i-3)^{th}$ pull-down transistor Tc(2i−3). The $(2i-1)^{th}$ forward scan control transistor Tb(2i−1) and the $(2i-3)^{th}$ forward scan control transistor Tb(2i−3) are arranged side by side along the second direction x1. The $(2i-1)^{th}$ reverse scan control transistor Ta(2i−1) and the $(2i-3)^{th}$ reverse scan control transistor Ta(2i−3) are arranged side by side along the second direction x1. The $(2i-1)^{th}$ pull-down transistor Tc(2i−1) and the $(2i-3)^{th}$ pull-down transistor Tc(2i−3) are arranged side by side along the second direction x1.

The second row of forward and reverse scan pull-down modules P12 includes a $(2i)^{th}$ forward and reverse scan pull-down module F(2i) and a $(2i-2)^{th}$ forward and reverse scan pull-down module F(2i−2). The $(2i-2)^{th}$ forward and reverse scan pull-down module F(2i−2) includes a $(2i-2)^{th}$ forward scan control transistor Tb(2i−2), a $(2i-2)^{th}$ reverse scan control transistor Ta(2i−2) and a $(2i-2)^{th}$ pull-down transistor Tc(2i−2). The $(2i)^{th}$ forward and reverse scan pull-down module F(2i) includes a $(2i)^{th}$ forward scan control transistor Tb(2i), a $(2i)^{th}$ reverse scan control transistor Ta(2i) and a $(2i)^{th}$ pull-down transistor Tc(2i). The $(2i-2)^{th}$ forward scan control transistor Tb(2i−2) and the $(2i)^{th}$ forward scan control transistor Tb(2i) are arranged side by side along the second direction x1. The $(2i-2)^{th}$ reverse scan control transistor Ta(2i−2) and the $(2i)^{th}$ reverse scan control transistor Ta(2i) are arranged side by side along the second direction x1. The $(2i-2)^{th}$ pull-down transistor Tc(2i−2) and the $(2i)^{th}$ pull-down transistor Tc(2i) are arranged side by side along the second direction x1.

Figure 9:
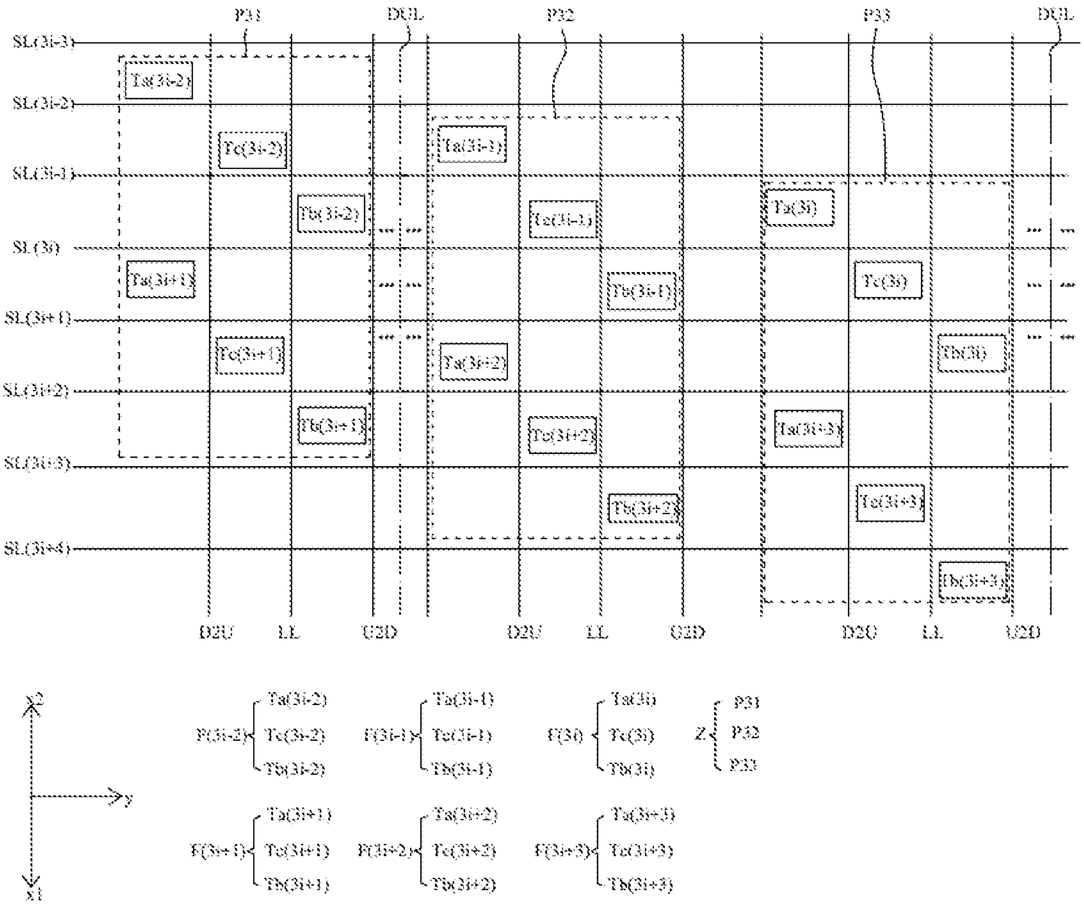
FIG. 9 is a partially enlarged schematic diagram of a display subarea of a display device according to still another embodiment of the present application.

Please refer to FIG. 9, which is a partially enlarged schematic diagram of a display subarea of a display device according to still another embodiment of the present application. The display device of this embodiment is basically similar to the display device shown in FIG. 1. Similar portion is not repeated, differences include the following: the plurality of scan lines SL include a $(3i-3)^{th}$ scan line SL(3i−3), a $(3i-2)^{th}$ scan line SL(3i−2), a $(3i-1)^{th}$ scan line SL(3i−1), a $(3i)^{th}$ scan line SL(3i), a $(3i+1)^{th}$ scan line SL(3i+1), a $(3i+2)^{th}$ scan line SL(3i+2), a $(3i+3)^{th}$ scan line SL(3i+3), and a $(3i+4)^{th}$ scan line SL(3i+4); the K is set to 3; each set of forward and reverse scan pull-down circuits Z includes a first row of forward and reverse scan pull-down module P31, a second row of forward and reverse scan pull-down module P32, and a third row forward and reverse sweep pull-down module P33 arranged along the first direction y.

Moreover, the first row of forward and reverse scan pull-down module P31 includes a $(3i-2)^{th}$ forward and reverse scan pull-down module F(3i−2) of which an output terminal is connected to the $(3i-2)^{th}$ scan line SL(3i−2), and the i is greater than or equal to 1 and less than or equal to N/3. The second row of forward and reverse scan pull-down module P32 includes a $(3i-1)^{th}$ forward and reverse scan pull-down module F(3i−1) of which an output terminal is connected to the $(3i-1)^{th}$ scan line SL(3i−1). The third row of forward and reverse scan pull-down module P33 includes a $(3i)^{th}$ forward and reverse scan pull-down module F(3i) of which an output terminal is connected to the $3i^{th}$ scan line SL(3i). By means of this arrangement, the N forward and reverse scan pull-down modules F of each set of forward and reverse scan pull-down circuits Z are arranged in three rows to realize that the falling edges of the scan signals transmitted by the N scan lines are rapidly pulled down, and that a problem of uneven display caused by line concentration is improved.

Specifically, in each set of forward and reverse scan pull-down circuits Z, the first row of forward and reverse scan pull-down module P31, the second row of forward and reverse scan pull-down module P32, and the third row of forward and reverse scan pull-down module P33 are arranged along the first direction y. The second row of forward and reverse scan pull-down module P32 is disposed between the first row of forward and reverse scan pull-down modules P31 and the third row of forward and reverse scan pull-down modules P33. There is one redundant signal line DUL disposed between the first row of forward and reverse scan pull-down module P31 and the second row of forward and reverse scan pull-down modules P32. There is one redundant signal line DUL disposed at a side of the third row of forward and reverse scan pull-down modules P33 away from the second row of forward and reverse scan pull-down modules P32. When a plurality of sets of forward and reverse scan pull-down circuits Z are provided, a corresponding relationship between the redundant signal lines DUL and each set of forward and reverse scan pull-down circuits Z is shown in FIG. 9.

The first row of forward and reverse scan pull-down module P31 includes a $(3i-2)^{th}$ forward and reverse scan pull-down module F(3i−2) and a $(3i+1)^{th}$ forward and reverse scan pull-down module F(3i+1). The $(3i-2)^{th}$ forward and reverse scan pull-down module F(3i−2) includes a $(3i-2)^{th}$ forward scan control transistor Tb(3i−2), a $(3i-2)^{th}$ reverse scan control transistor Ta(3i−2) and a $(3i-2)^{th}$ pull-down transistor Tc(3i−2). The $(3i+1)^{th}$ forward and reverse scan pull-down module F(3i+1) includes a $(3i+1)^{th}$ forward scan control transistor Tb(3i+1), a $(3i+1)^{th}$ reverse scan control transistor Ta (3i+1) and a $(3i+1)^{th}$ pull-down transistor Tc(3i+1). The $(3i-2)^{th}$ forward scan control transistor Tb(3i−2) and the $(3i+1)^{th}$ forward scan control transistor Tb(3i+1) are arranged side by side along the second direction x1. The $(3i-2)^{th}$ reverse scan control transistor Ta(3i−2) and the $(3i+1)^{th}$ reverse scan control transistor Ta(3i+1) are arranged side by side along the second direction x1. The $(3i-2)^{th}$ pull-down transistor Tc(3i−2) and the $(3i+1)^{th}$ pull-down transistor Tc(3i+1) are arranged side by side along the second direction x1.

The second row of forward and reverse scan pull-down module P32 includes a $(3i-1)^{th}$ forward and reverse scan pull-down module F(3i−1) and a $(3i+2)^{th}$ forward and reverse scan pull-down module F(3i+2). The $(3i-1)^{th}$ forward and reverse scan pull-down module F(3i−1) includes a $(3i-1)^{th}$ forward scan control transistor Tb(3i−1), a $(3i-1)^{th}$ reverse scan control transistor Ta(3i−1) and a $(3i-1)^{th}$ pull-down transistor Tc(3i−1). The $(3i+2)^{th}$ forward and reverse scan pull-down module F(3i+2) includes a $(3i+2)^{th}$ forward scan control transistor Tb(3i+2), a $(3i+2)^{th}$ reverse scan control transistor Ta (3i+2) and a $(3i+2)^{th}$ pull-down transistor Tc(3i+2). The $(3i-1)^{th}$ forward scan control transistor Tb(3i−1) and the $(3i+2)^{th}$ forward scan control transistor Tb(3i+2) are arranged side by side along the second direction x1. The $(3i-1)^{th}$ reverse scan control transistor Ta(3i−1) and the $(3i+2)^{th}$ reverse scan control transistor Ta(3i+2) are arranged side by side along the second direction x1. The $(3i-1)^{th}$ pull-down transistor Tc(3i−1) and the $(3i+2)^{th}$ pull-down transistor Tc(3i+2) are arranged side by side along the second direction x1.

The third row of forward and reverse scan pull-down module P33 includes a $(3i)^{th}$ forward and reverse scan pull-down module F(3i) and a $(3i+3)^{th}$ forward and reverse scan pull-down module F(3i+3). The $(3i)^{th}$ forward and reverse scan pull-down module F(3i) includes a $(3i)^{th}$ forward scan control transistor Tb(3i), a $(3i)^{th}$ reverse scan control transistor Ta(3i) and a $(3i)^{th}$ pull-down transistor Tc(3i). The $(3i+3)^{th}$ forward and reverse scan pull-down module F(3i+3) includes a $(3i+3)^{th}$ forward scan control transistor Tb(3i+3), a $(3i+3)^{th}$ reverse scan control transistor Ta(3i+3) and a $(3i+3)^{th}$ pull-down transistor Tc(3i+3). The $(3i)^{th}$ forward scan control transistor Tb(3i) and the $(3i+3)^{th}$ forward scan control transistor Tb(3i+3) are arranged side by side along the second direction x1. The $(3i)^{th}$ reverse scan control transistor Ta(3i) and the $(3i+3)^{th}$ reverse scan control transistor Ta(3i+3) are arranged side by side along the second direction x1. The $(3i)^{th}$ pull-down transistor Tc(3i) and the $(3i+3)^{th}$ pull-down transistor Tc(3i+3) are arranged side by side along the second direction x1.

The descriptions of the above-mentioned embodiments are only used to help understand the technical solutions and core ideas of the present application. Those of ordinary skill in the art should understand that they can still modify the technical solutions described in the foregoing embodiments, or equivalently replace some of the technical features; and these modifications or replacements do not cause the essence of the corresponding technical solutions to deviate from the scope of the technical solutions of the embodiments of the present application.

What is claimed is:

1. A display panel, comprising a display area comprising at least one display subarea, and further comprising:

N scan lines, wherein at least a part of each of the N scan lines is disposed in the display subarea, the N scan lines extend along a first direction and are arranged side by side along a second direction, the first direction intersects the second direction, and the N is an integer greater than or equal to 1; and J sets of forward and reverse scan pull-down circuits disposed corresponding to the display subarea, wherein each set of the forward and reverse scan pull-down circuits comprises N forward and reverse scan pull-down modules, at least a part of each of the forward and reverse scan pull-down module is disposed in the display subarea, and the J is an integer greater than or equal to 1;

wherein in each set of the forward and reverse scan pull-down circuits, output terminals of the N forward and reverse scan pull-down modules are electrically connected to the N scan lines in a one-to-one correspondence;

wherein each set of the forward and reverse scan pull-down circuits comprises K rows of forward and reverse scan pull-down modules, each row of the forward and reverse scan pull-down modules comprises N/K forward and reverse scan pull-down modules arranged along the second direction, and the K is greater than or equal to 1 and less than or equal to N; and wherein each of the forward and reverse scan pull-down modules comprises:

a forward scan control unit;

a reverse scan control unit; and a pull-down unit, wherein a control terminal of the pull-down unit is connected to an output terminal of the forward scan control unit and an output terminal of the reverse scan control unit, and an output terminal of the pull-down unit is connected to one of the scan lines wherein the display panel further comprises:

J groups of signal lines disposed corresponding to the display subarea, wherein each group of signal lines is disposed corresponding to one set of forward and reverse scan pull-down circuits, each group of signal lines comprises K groups of common signal lines, and the N/K forward and reverse scan pull-down modules of each row of forward and reverse scan pull-down modules are connected to one group of common signal lines;

wherein each group of common signal lines comprises a forward scan control signal line, a reverse scan control signal line and a low level signal line arranged adjacent to each other, and the forward scan control signal line, the reverse scan control signal line and the low level signal line extend along the second direction and are arranged along the first direction;

wherein second input terminals of the forward scan control units of the N/K forward and reverse scan pull-down modules of each row of the forward and reverse scan pull-down modules are connected to a same forward scan control signal line;

wherein second input terminals of the reverse scan control units of the N/K forward and reverse scan pull-down modules of each row of the forward and reverse scan pull-down modules are connected to a same reverse scan control signal line; and wherein input terminals of the pull-down units of the N/K forward and reverse scan pull-down modules of each row of the forward and reverse scan pull-down modules are connected to a same low level signal line.

2. The display panel of claim 1, wherein the J sets of forward and reverse scan pull-down circuits are arranged along the first direction.

3. The display panel of claim 1, wherein the output terminal of the pull-down unit of one of the forward and reverse scan pull-down modules of which an output terminal is connected to an $i^{th}$ scan line is connected to the $i^{th}$ scan line;

a first input terminal of the forward scan control unit of one of the forward and reverse scan pull-down modules of which the output terminal is connected to the $i^{th}$ scan line is connected to an $(i+1)^{th}$ scan line;

a first input terminal of the reverse scan control unit of one of the forward and reverse scan pull-down modules of which the output terminal is connected to the $i^{th}$ scan line is connected to an $(i-1)^{th}$ scan line; and the i is greater than or equal to 2 and is less than or equal to N−1.

4. The display panel of claim 1, wherein the K is equal to 1.

5. The display panel of claim 1, wherein the K is equal 2, each set of forward and reverse scan pull-down circuits comprises a first row of forward and reverse scan pull-down module and a second row of forward and reverse scan pull-down module arranged along the first direction;

wherein the first row of forward and reverse scan pull-down module comprises one of the forward and reverse scan pull-down modules of which an output terminal is connected to a $(2i-1)^{th}$ scan line; and wherein the second row of forward and reverse scan pull-down module comprises one of the forward and reverse scan pull-down modules of which an output terminal is connected to a $2i^{th}$ scan line, and the i is greater than or equal to 1 and is less than or equal to N/2.

6. The display panel of claim 1, wherein the K is equal 3, each set of forward and reverse scan pull-down circuits comprises a first row of forward and reverse scan pull-down module, a second row of forward and reverse scan pull-down module, and a third row of forward and reverse scan pull-down module arranged along the first direction;

wherein the first row of forward and reverse scan pull-down module comprises one of the forward and reverse scan pull-down modules of which an output terminal is connected to a $(3i-2)^{th}$ scan line, and the i is greater than or equal to 1 and is less than or equal to N/3;

wherein the second row of forward and reverse scan pull-down module comprises one of the forward and reverse scan pull-down modules of which an output terminal is connected to a $(3i-1)^{th}$ scan line; and wherein the third row of forward and reverse scan pull-down module comprises one of the forward and reverse scan pull-down modules of which an output terminal is connected to a $(3i)^{th}$ scan line.

7. The display panel of claim 1, wherein the display panel further comprises:

at least one redundant signal line extending along the second direction, which is disposed on a same layer and comprises a same material with at least one of the forward scan control signal line, the reverse scan control signal line, and the low level signal line.

8. A display device, comprising a display panel, wherein the display panel comprises a display area comprising at least one display subarea, and the display panel further comprises:

N scan lines, wherein at least a part of each of the N scan lines is disposed in the display subarea, the N scan lines extend along a first direction and are arranged side by side along a second direction, the first direction intersects the second direction, and the N is an integer greater than or equal to 1;

J sets of forward and reverse scan pull-down circuits disposed corresponding to the display subarea, wherein each set of the forward and reverse scan pull-down circuits comprises N forward and reverse scan pull-down modules, at least a part of each of the forward and reverse scan pull-down module is disposed in the display subarea, and the J is an integer greater than or equal to 1; and wherein in each set of the forward and reverse scan pull-down circuit, output terminals of the N forward and reverse scan pull-down modules are electrically connected to the N scan lines in a one-to-one correspondence;

wherein each set of the forward and reverse scan pull-down circuits comprises K rows of forward and reverse scan pull-down modules, each row of the forward and reverse scan pull-down modules comprises N/K forward and reverse scan pull-down modules arranged along the second direction, and the K is greater than or equal to 1 and less than or equal to N; and wherein each of the forward and reverse scan pull-down modules comprises:

a forward scan control unit;

a reverse scan control unit; and a pull-down unit, wherein a control terminal of the pull-down unit is connected to an output terminal of the forward scan control unit and an output terminal of the reverse scan control unit, and an output terminal of the pull-down unit is connected to one of the scan lines wherein the display panel further comprises:

J groups of signal lines disposed corresponding to the display subarea, wherein each group of signal lines is disposed corresponding to one set of forward and reverse scan pull-down circuits, each group of signal lines comprises K groups of common signal lines, and the N/K forward and reverse scan pull-down modules of each row of forward and reverse scan pull-down modules are connected to one group of common signal lines;

wherein each group of common signal lines comprises a forward scan control signal line, a reverse scan control signal line and a low level signal line arranged adjacent to each other, and the forward scan control signal line, the reverse scan control signal line and the low level signal line extend along the second direction and are arranged along the first direction;

wherein second input terminals of the forward scan control units of the N/K forward and reverse scan pull-down modules of each row of the forward and reverse scan pull-down modules are connected to a same forward scan control signal line;

wherein second input terminals of the reverse scan control units of the N/K forward and reverse scan pull-down modules of each row of the forward and reverse scan pull-down modules are connected to a same reverse scan control signal line; and wherein input terminals of the pull-down units of the N/K forward and reverse scan pull-down modules of each row of the forward and reverse scan pull-down modules are connected to a same low level signal line.

9. The display device of claim 8, wherein the J sets of forward and reverse scan pull-down circuits are arranged along the first direction.

10. The display device of claim 8, wherein the output terminal of the pull-down unit of one of forward and reverse scan pull-down modules of which an output terminal is connected to an $i^{th}$ scan line is connected to the $i^{th}$ scan line;

a first input terminal of the forward scan control unit of one of the forward and reverse scan pull-down modules of which the output terminal is connected to the $i^{th}$ scan line is connected to an $(i+1)^{th}$ scan line;

a first input terminal of the reverse scan control unit of one of the forward and reverse scan pull-down modules of which the output terminal is connected to the $i^{th}$ scan line is connected to an $(i-1)^{th}$ scan line; and the i is greater than or equal to 2 and is less than or equal to N−1.

11. The display device of claim 8, wherein the K is equal to 1.

12. The display device of claim 8, wherein the K is equal to 2, each set of forward and reverse scan pull-down circuits comprises a first row of forward and reverse scan pull-down module and a second row of forward and reverse scan pull-down module arranged along the first direction;

wherein the first row of forward and reverse scan pull-down module comprises one of the forward and reverse scan pull-down modules of which an output terminal is connected to a $(2i-1)^{th}$ scan line; and wherein the second row of forward and reverse scan pull-down module comprises one of the forward and reverse scan pull-down modules of which an output terminal is connected to a $2i^{th}$ scan line, and the i is greater than or equal to 1 and is less than or equal to N/2.

13. The display device of claim 8, wherein the K is equal to 3, each set of forward and reverse scan pull-down circuits comprises a first row of forward and reverse scan pull-down module, a second row of forward and reverse scan pull-down module, and a third row of forward and reverse scan pull-down module arranged along the first direction;

wherein the first row of forward and reverse scan pull-down module comprises one of the forward and reverse scan pull-down modules of which an output terminal is connected to a $(3i-2)^{th}$ scan line, and the i is greater than or equal to 1 and is less than or equal to N/3;

wherein the second row of forward and reverse scan pull-down module comprises one of the forward and reverse scan pull-down modules of which an output terminal is connected to a $(3i-1)^{th}$ scan line; and wherein the third row of forward and reverse scan pull-down module comprises one of the forward and reverse scan pull-down modules of which an output terminal is connected to a $3i^{th}$ scan line.

14. The display device of claim 8, wherein the display panel further comprises:

at least one redundant signal line extending along the second direction, which is disposed on a same layer and comprises a same material with at least one of the forward scan control signal line, the reverse scan control signal line, and the low level signal line.

* * * * *